March 10, 1925.
A. WILD
AUTOMATIC HEAT REGULATOR
Filed Dec. 3, 1923
1,529,457
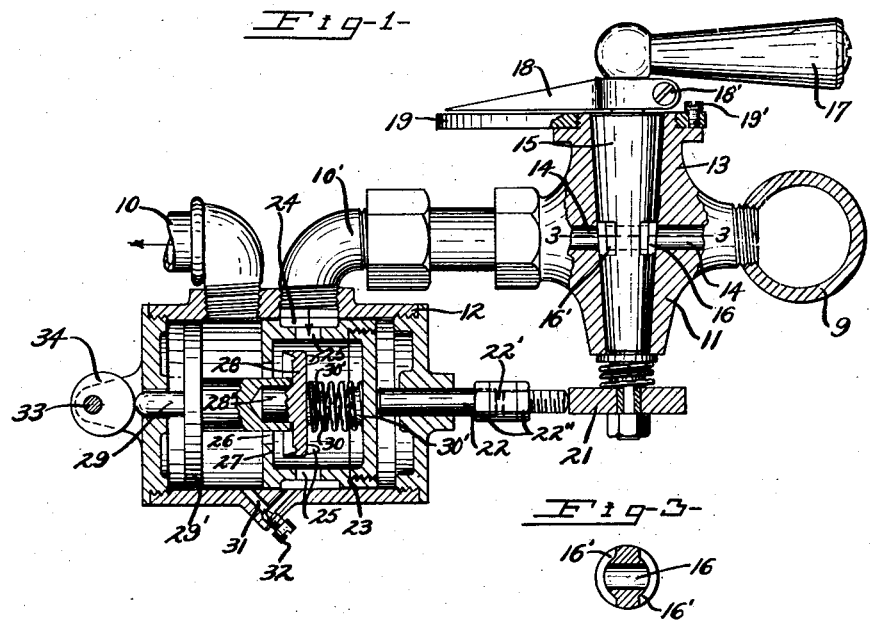
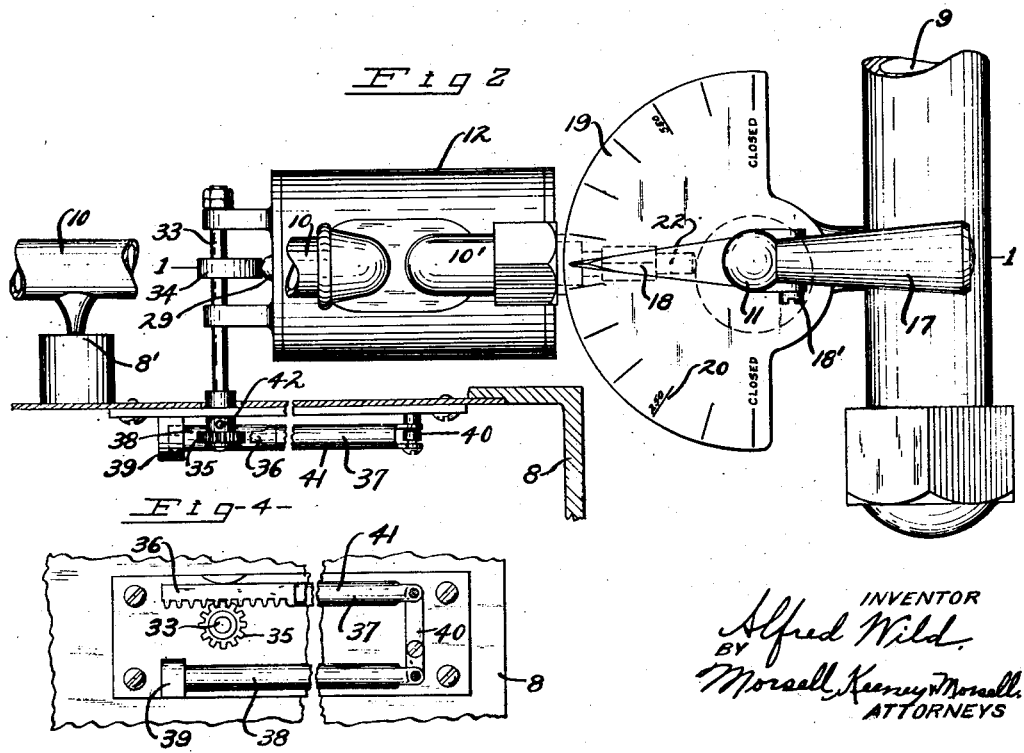
INVENTOR
Alfred Wild
BY
Morsell, Keeney & Morsell
ATTORNEYS Patented Mar. 10, 1925.

1,529,457

UNITED STATES PATENT OFFICE.

ALFRED WILD, OF MILWAUKEE, WISCONSIN.

AUTOMATIC HEAT REGULATOR.

Application filed December 3, 1923. Serial No. 678,290.

*To all whom it may concern:*

Be it known that I, ALFRED WILD, a citizen of Czechoslovakia, and resident of Milwaukee, in the county of Milwaukee and State of Wisconsin, have invented new and useful Improvements in Automatic Heat Regulators, of which the following is a description, reference being had to the accompanying drawings, which are a part of this specification.

This invention relates to improvements in automatic heat regulators more particularly adapted for household ovens.

Ovens of the better class now on the market are provided with valves for controlling the supply of fuel and for controlling the degree of temperature of the oven thus necessitating the operation of several valves to secure the desired temperature.

It is one of the objects of the present invention to overcome this objectionable feature and provide an automatic heat regulator in which both the supply of the fuel and the regulation of the temperature is controlled by a single handle.

A further object of the invention is to provide an automatic heat regulator in which the movement of the thermostat controlling the heat regulation is compounded in a very simple and direct manner.

A further object of the invention is to provide an automatic heat regulator having visible means for indicating the different temperatures for setting the control member.

A further object of the invention is to provide an automatic heat regulator in which the supply of fuel is automatically decreased when the desired temperature has been obtained.

A further object of the invention is to provide an automatic heat regulator having means for adjusting the thermostatic member with relation to the other portion of the regulator.

A further object of the invention is to provide an automatic heat regulator which is of simple construction is strong and durable and is well adapted for the purpose described.

With the above and other objects in view the invention consists of the improved automatic heat regulator and its parts and combinations as set forth in the claims, and all equivalents thereof.

In the accompanying drawing in which the same reference characters indicate the same parts in all of the views:

Fig. 1 is a longitudinal sectional view taken on line 1—1 of Fig. 2;

Fig. 2 is a top view thereof with a portion of the oven shown in section;

Fig. 3 is a sectional detail view taken on line 3—3 of Fig. 1; and

Fig. 4 is a detail face view of the thermostatic device forming part of the regulator.

Referring to the drawing the numeral 8 indicates an oven part which is supplied with the fuel gas for heating the same by means of a main pipe 9 and a branch pipe 10. A manually actuated valve 11 is connected to the main pipe 9 and an automatic valve 12 is interposed between and connected to the valve 11 and the branch pipe 10. The valve 11 is provided with a casing 13 having the usual ports 14, and a conical plug portion 15 having a port 16 which may be moved into register with the ports 14. Said port 16 is formed with branch leads 16' to provide a more gradual registration with the ports 14. The plug 15 is provided with a handle 17 at its upper end, and is also provided with an indicating finger 18 which coacts with a dial 19 mounted on the valve casing 13. Said dial 19 has graduation lines and figures 20 delineated thereon to indicate the degree of heat produced in the oven when the indicating finger is in register with any particular graduation line. The indicating finger 18 is adjustably clamped to the plug by a screw 18' while the dial 19 is adjustably threaded on the valve casing 13 and held in adjusted position by a screw 19'. The lower stem portion of the plug valve carries a cam 21 which co-acts with the outer end of an adjustable piston rod 22 slidably extending through the outer end of the automatic valve casing 12 so that as the valve plug 15 is turned to the full on position the piston rod 22 will be pushed into the casing 12 to the greatest extent.

A piston valve seat 23 is mounted within the casing 12 and its closed end or head bears against the inner end of the piston rod 22 and is moved thereby. A tube 10' connects the valve 13 to the valve casing 12 immediately above piston valve 23 and said piston valve seat 23 is formed with an annular groove 24 always in register with the opening of the pipe 10' and said piston valve is provided with side openings 25 in register with the annular recess 24 to permit fuel gas entering the casing 12 to flow into the bore of the piston valve seat 23. The end of the piston valve opposite to its head is provided with an outer opening or port 26 and a valve seat 27 surrounding said seat which is engaged by an automatic valve 28 movably positioned within the piston valve 23. A reciprocal guide rod 29 extends through the inner end of the casing and is of tubular form at its inner end to slidably receive and guide the stem 28' of the valve 28. Said guide rod is formed with an annular guide flange 29' which bears against the inner wall of the casing 12. A coiled spring 30 interposed between the automatic valve 28 and the head of the piston valve 23 and held by knobs 30' thereon is adapted to hold the piston valve against the inner end of the rod 22 and the valve 28 against the inner end of the guide rod 29 and against its seat 27 when in closed position.

The pipe 10 is connected to the casing 12 at a point between the piston valve 23 and the guide flange 29' so that the fuel gas passing through the central opening or port 26 and into the space between the said piston valve and guide flange is free to flow into the pipe 10 and therethrough to the burner 8' of the oven.

An angular duct 31 formed in the casing 12 and opening at one end into the space enclosed by the annular recess 24 and at its other end into the space between the piston valve and the guide flange 29' is adapted to supply fuel gas at all times to the pilot light (not shown) of the oven. A screw valve 32 threading into said angular duct is adapted to control the flow of fuel gas to said pilot light.

A transversely extending shaft 33 journaled on the inner end of the casing 12 carries a cam 34, the periphery of which is engaged by the inner rounded end of the guide rod 29. Said shaft 33 extends into the oven and at its inner end is provided with a pinion 35 which is in mesh with a rack bar 36 mounted on the free end of a compound thermostat or expansion bar 37. The thermostat is positioned within the oven and comprises a bar of expansible material 38 secured at one end to a support 39 and having its other end pivotally connected to the short arm of a lever 40. The outer end of the long arm of said lever 40 is pivotally connected to one end of a supplemental bar 41 of expansible material and to the other end of said supplemental bar the rack bar 36 is connected so that in use the movement of the rack bar will be compounded by the leverage between the two bars and the expansion of both bars.

The piston rod 22 is adjustable by turning the squared portion 22' of the threaded portion into or out of the adjacent straight portion and then tightening up on the jam nuts 22" while the relative movement of the parts are adjusted by removing the pinion 35 and changing its relative engagement with the rack bar. A set screw 42 provides for locking the pinion to the shaft.

In use the plug valve 15 is turned to the desired graduation on the dial and this movement will move the valve seat 27 away from the valve and permit the entrance of the fuel gas to the burner as shown in Fig. 1. Now as the oven heats the thermostat will expand and turn the cam 34 away from the end of the guide rod 29 and the spring 30 will move the valve 28 towards its seat until the amount of gas passing through the opening 26 is sufficient to maintain the desired temperature. When the valve 15 is moved to closed position the valve 28 will rest against its seat and only sufficient gas will be provided to keep the pilot light burning.

From the foregoing description it will be seen that only one manually actuated valve is required to control the supply of gas and the regulation of the heat to and in the oven.

From the foregoing description it will be seen that the automatic heat regulator is of very simple construction and will automatically maintain any desired heat in the oven within its capacity.

What I claim as my invention is:

1. The combination with a stove having a burner, of an automatic heat regulator therefor, comprising a pipe for supplying a fluid to the burner, a manually actuated valve controlling the flow of fluid through said pipe, and a thermostatically controlled means controlling the flow of the fluid from the valve to the burner, the valve seat of the thermostatically controlled means being adjusted by the movement of the manually actuated valve.

2. The combination with a stove having a burner, of an automatic heat regulator therefor, comprising a pipe for supplying fluid to the burner, a manually actuated valve controlling the flow of fluid through said pipe, and a thermostatically controlled valve controlling the flow of the fluid from the manually actuated valve to the burner, said manually actuated valve also controlling the degree of opening of the thermostatic valve, by moving its seat towards or away from the thermostatic valve.

3. The combination with a stove having a burner, of an automatic heat regulator therefor, comprising a pipe for supplying fluid to the burner, a manually actuated valve controlling the flow of fuel through said pipe, a thermostatically controlled valve automatically controlling the flow of the fluid from the manually actuated valve to the burner, and a connection between both valves for limiting the opening of the thermostatic valve by the position of the manually actuated valve by moving the thermostatic valve seat towards or away from the thermostatic valve.

4. The combination with a stove having a burner, of an automatic heat regulator therefor, comprising a pipe for supplying fluid to the burner, a manually actuated valve controlling the flow of fluid through said pipe, a valve casing connected to the pipe and interposed between the valve and the burner, a movable valve member and valve seat member within the valve casing, a connection between the manually actuated valve and one of the members for moving the same, a thermostat position to receive heat from the oven, and a connection between the thermostat and the other member for moving the same.

5. The combination with a stove having a burner, of an automatic heat regulator therefor, comprising a pipe for supplying fluid to the burner, a manually actuated valve controlling the flow of fluid through said pipe, a valve casing connected to the pipe and interposed between the valve and the burner, a movable valve seat within the casing, a connection between the valve seat and the manually actuated valve for moving the valve seat when the valve is moved, a valve within the casing which coacts with the valve seat, a thermostat positioned to receive heat from the oven, and a connection between the thermostat and the valve in the casing for controlling the position of the valve in the casing with relation to the valve seat.

6. The combination with a stove having a burner, of an automatic heat regulator therefor, comprising a pipe for supplying fluid to the burner, a manually actuated valve controlling the flow of fluid through said pipe, a valve casing connected to the pipe and interposed between the valve and the burner and through which the fluid passes, a piston valve seat member within the casing for dividing the casing into two compartments, said valve seat member having an opening in communication with both casing compartments, a connection between the manually actuated valve and the valve seat member for moving said valve seat member a relative distance when the manually actuated valve is moved to an indicated position, a valve within the casing for closing the valve seat opening, a connection extending outwardly from said casing valve, a thermostat positioned to receive heat from the stove, and a rotary member moved by the thermostat for actuating the casing valve connection.

7. The combination with a stove having a burner, of an automatic heat regulator therefor, comprising a pipe for supplying fluid to the burner, a manually actuated valve controlling the flow of fluid through said pipe, a valve casing connected to the pipe, and interposed between the valve and the burner and through which the fluid passes, a piston valve seat member within the casing for dividing the casing into two compartments, said valve seat member having an opening in communication with both casing compartments, a connection between the manually actuated valve and the valve seat member for moving said valve seat member a relative distance when the manually actuated valve is moved to an indicated position, a valve within the casing for closing the valve seat opening, a coiled spring positioned between the casing valve and the valve seat member for moving the valve and valve seat towards a closed position, a rod engaging the casing valve and extending outwardly therefrom, a thermostat positioned to receive heat from the stove, and a shaft rotated by the thermostat and having means for moving the casing valve rod inwardly against the pressure of the spring.

8. The combination with a stove having a burner, of an automatic heat regulator therefor, comprising a pipe for supplying fluid to the burner, a manually actuated valve controlling the flow of fluid through said pipe, a valve casing connected to the pipe and interposed between the valve and the burner and through which the fluid passes, a piston valve seat member within the casing for dividing the casing into two compartments, said valve seat member having an opening in communication with both casing compartments, said manually actuated valve having a cam portion, a rod interposed between the cam portion and the valve seat member, a valve within the casing for closing the valve seat opening, a coiled spring positioned between the casing valve and the valve seat member for moving the valve and valve seat member towards a closed position, a rod engaging the casing valve and extending outwardly therefrom, a thermostat positioned to receive heat from the stove, and a shaft rotated by the thermostat and having a cam portion which engages the casing valve rod.

9. The combination with a stove having a burner, of an automatic heat regulator therefor, comprising a pipe for supplying fluid to the burner, a manually actuated valve controlling the flow of fluid through said pipe, a valve casing connected to the pipe and interposed between the valve and the burner and through which the fluid passes, a piston valve seat member within the casing for dividing the casing into compartments, said valve seat member having an opening in communication with both casing compartments, said manually actuated valve having a cam portion, a rod interposed between the cam portion and the valve seat member, a valve within the casing for closing the valve seat opening, a coiled spring positioned between the casing valve and the valve seat member for moving the valve and valve seat member towards a closed position, a rod engaging the casing valve and extending outwardly therefrom, an endwise expansible thermostat positioned to receive heat from the stove and having rack teeth at its free end, and a shaft journaled on the valve casing and having a pinion in mesh with the rack teeth and also having a cam in engagement with the casing valve rod.

10. The combination with a stove having a burner, of an automatic heat regulator therefor, comprising a pipe for supplying fluid to the burner, a manually actuated valve controlling the flow of fluid through said pipe, a valve casing connected to the pipe and interposed between the valve and the burner and through which the fluid passes, a piston valve seat member within the casing for dividing the casing into two compartments, said valve seat member having an opening in communication with both casing compartments, a valved by-pass duct between the two compartments, a connection between the manually actuated valve and the valve seat member for moving said valve seat member a relative distance when the manually actuated valve is moved to an indicated position, a valve within the casing for closing the valve seat opening, a connection extending outwardly from said casing valve, a thermostat positioned to receive heat from the stove, and a rotary member moved by the thermostat for actuating the casing valve connection.

11. The combination with a stove having a burner, of an automatic heat regulator therefor, comprising a pipe for supplying fluid to the burner, a manually actuated valve controlling the flow of fluid through said pipe, a valve casing connected to the pipe and interposed between the valve and the burner and through which the fluid passes, a piston valve seat member within the casing for dividing the casing into two compartments, said valve seat member having an opening in communication with both casing compartments, a valved by-pass duct between the two compartments, said manually actuated valve having a cam portion, a rod interposed between the cam portion and the valve seat member, a valve within the casing for closing the valve seat opening, a coiled spring positioned between the casing valve and the valve seat member for moving the valve and valve seat member towards a closed position, a rod engaging the casing valve and extending outwardly therefrom, an endwise expansible thermostat positioned to receive heat from the stove and having rack teeth at its free end, and a shaft journaled on the valve casing and having a pinion in mesh with the rack teeth and also having a cam in engagement with the casing valve rod.

12. The combination with a stove having a burner and fuel supply pipe, of an automatic regulator therefor, comprising a valve mechanism interposed between the supply pipe and the stove and consisting of a manually controlled means for controlling the flow of fuel through the supply pipe and a thermostatic means including a valve for automatically controlling the flow of fuel to the burner, the two means being connected to respond to any adjustment of the manually controlled means to automatically maintain any predetermined temperature in the stove.

In testimony whereof, I affix my signature.

ALFRED WILD.